Wᴹ. COVER.
ANIMAL TRAP.

No. 72979

PATENTED JAN 7 1868

Witnesses.
M. B. Gilbert
Geo. H. Griebel

Inventor
Wm Cover
by Dodge & Munn
his attys.

United States Patent Office.

WILLIAM COVER, OF JENNER'S CROSS-ROADS, PENNSYLVANIA.

Letters Patent No. 72,979, dated January 7, 1868.

IMPROVED ANIMAL-TRAP.

*The Schedule referred to in these Letters Patent and making part of the same.*

TO ALL WHOM IT MAY CONCERN:

Be it known that I, WILLIAM COVER, of Jenner's Cross-Roads, in the county of Somerset, and State of Pennsylvania, have invented certain new and useful Improvements in Animal-Traps; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in a novel construction of a trap for catching rats and similar small animals, and by which construction the trap shall be made to reset itself and be continuous in its operation.

Figure 3:
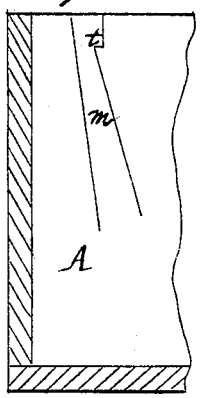
Figure 4:
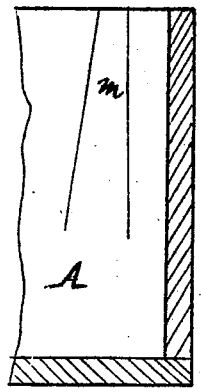
Figure 5:
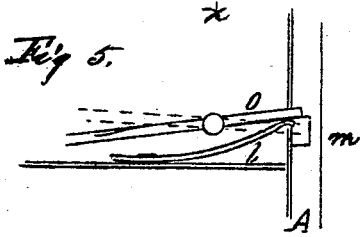

Figures 3, 4, and 5, are views of portions shown in detail.

Figure 1:
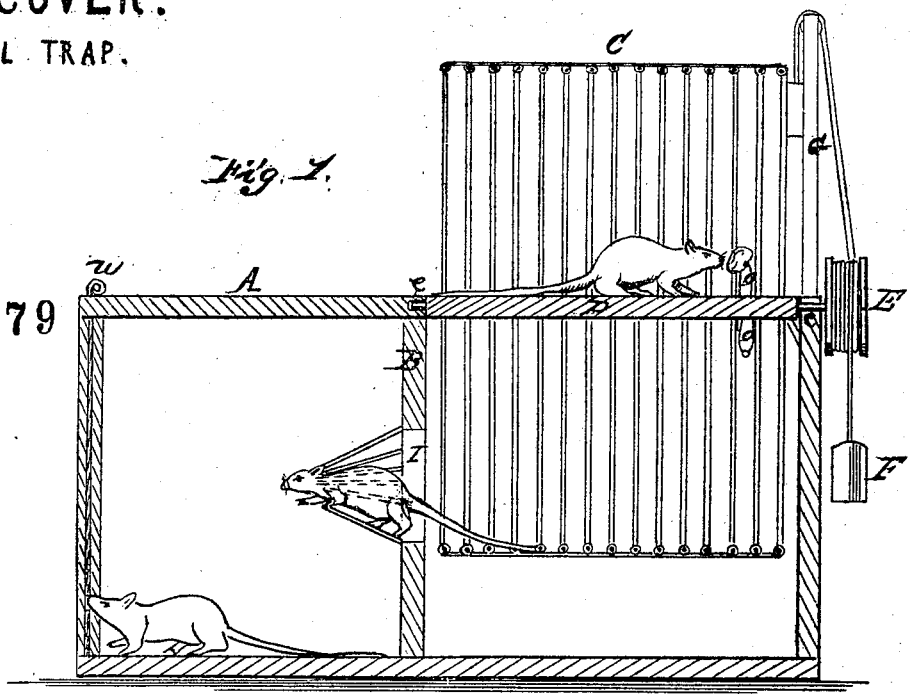
Figure 1 is a longitudinal vertical section taken on the line $xx$ of fig. 2.
Figure 2:
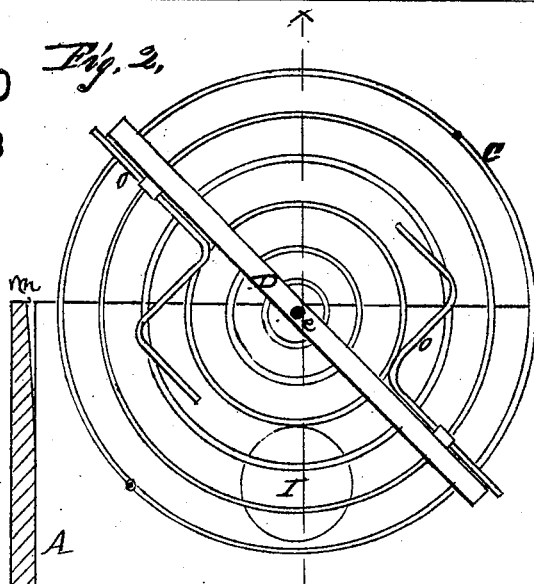
Figure 2 is a transverse vertical section.

I construct a rectangular box, A, having a vertical partition, B, as shown in fig. 1, that portion to one side of the partition being permanently closed, and having one end closed by a series of wires or rods, $u$, while in the other portion is fitted a cylinder composed of wires, and having a longitudinal central division, D, of proper size to fill that portion of the top of the box when placed horizontally therein. This cylinder is arranged to revolve on journals $e$ located at the centre of each end of the plate D, the cylinder C being one half within and the other half above the box A, as shown in figs. 1 and 2. Upon the opposite edges, and on the opposite sides of this plate D, a lever, $o$, is pivoted, having its inner end bent so as to project above the surface of the plate D, as shown in fig. 2, the opposite ends of the levers projecting out beyond the edge of the plate, there being grooves, $m$, cut in the opposite sides of the box A for these projecting ends to pass in as the cylinder revolves. The levers $o$ have each a spring, $l$, pressing against their side in such a way as to throw the projecting end of the lever out of line with the groove $m$, and causing them to strike upon the edge of the side of the box A, as shown in fig. 5, and thereby prevent the cylinder from revolving until the lever $o$ is drawn around by the animal pulling at the bait on its opposite end, when the projecting end of the lever is brought over the groove, which it at once enters, the cylinder being caused to revolve by means of the weight F attached to a cord wound around the pulley E on the end of the outer journal $e$, as shown in fig. 1. If desired to elevate the weight from the ground, it may have its cord passed over a pulley on the top of a vertical post, I, as represented in red in fig. 1. It will be observed that when in position, the plate D forms a floor or continuation of the cover to the closed portion of the box upon which the animal enters through the open end of the cylinder C to reach the bait. To prevent the cylinder from being turned backward by the weight of the animal, a shoulder, $t$, is formed in one side of the channel $m$, as shown in fig. 3, upon which the ascending lever $o$ rests, thereby locking the cylinder in place in connection with the lever on the opposite side. An opening, I, is made through the partition B, and has surrounding it a series of pointed wires set with their loose ends converging, as shown in fig. 2, to permit the animal to pass through from the lower portion of the cylinder, and prevent their returning through said passage.

The operation is as follows: Bait is placed upon the inner ends of each of the levers $o$, and the weight wound up. The animal jumps upon the top of the box, and enters the open end of the cylinder to reach the bait. By its efforts to remove the bait, the lever $o$ is moved so as to cause its outer end to enter the groove $m$, when the weight instantly causes the cylinder to make a half revolution, which carries the animal within the box, and the plate D being brought to a horizontal position, and closing that portion of the box, there is no escape for the animal except through the hole I into the other apartment, where it is kept secure until removed by the owner of the trap.

By this means I produce a very simple and efficient trap, which resets itself each time it is operated, and that may thus continue to operate automatically until the weight reaches the ground.

Having thus described my invention, what I claim, is—

A trap, consisting of a box, A, having one part closed by a cover, and a partition, B, having an opening through it, and with the revolving wire cylinder C mounted in the open portion of the box A, all constructed and arranged for operation, as shown and described.

WM. COVER.

Witnesses:
 NEWTON S. GRIFFITH,
 G. R. GRIFFITH.